(12) United States Patent
Nair

(10) Patent No.: US 11,994,725 B2
(45) Date of Patent: May 28, 2024

(54) CIRCULAR OPTICAL ARRAY SYSTEM USING WAVEGUIDE FED ANGLED MIRRORS

(71) Applicant: Amrita Vishwa Vidyapeetham, Tamil Nadu (IN)

(72) Inventor: Viswas S. Nair, Kottayam (IN)

(73) Assignee: Amrita Vishwa Vidyapectham (IN)

(*) Notice: Subject to any disclaimer, the term of this patent is extended or adjusted under 35 U.S.C. 154(b) by 23 days.

(21) Appl. No.: 17/411,167

(22) Filed: Aug. 25, 2021

(65) Prior Publication Data

US 2022/0137310 A1    May 5, 2022

(51) Int. Cl.
*G02B 6/42*    (2006.01)

(52) U.S. Cl.
CPC .................. *G02B 6/4246* (2013.01)

(58) Field of Classification Search
CPC . G02B 6/4246; G02B 2203/50; G02B 1/2955
See application file for complete search history.

(56) References Cited

U.S. PATENT DOCUMENTS

| | | | | |
|---|---|---|---|---|
| 4,149,770 A * | 4/1979 | Milton | ................. | G02B 6/4246 385/38 |
| 4,314,740 A * | 2/1982 | Bickel | ................. | G02B 6/2817 385/127 |
| 4,995,694 A * | 2/1991 | Rieger | ................. | G02B 6/2817 385/94 |
| 6,335,994 B1 * | 1/2002 | Kato | ................. | G02F 1/313 385/32 |
| 6,434,303 B1 * | 8/2002 | Temkin | ................. | G02B 6/12011 385/46 |
| 6,493,487 B1 * | 12/2002 | Temkin | ................. | G02B 6/12011 385/24 |
| 6,553,165 B1 * | 4/2003 | Temkin | ................. | G02B 6/12011 385/37 |
| 7,065,270 B2 * | 6/2006 | Okada | ................. | G02B 6/2817 385/32 |
| 7,295,330 B2 * | 11/2007 | Chow | ................. | G01B 11/0625 356/237.1 |
| 7,440,655 B2 * | 10/2008 | Grek | ................. | G02B 6/12026 385/37 |
| 8,284,635 B2 * | 10/2012 | Matsumoto | ................. | G11B 5/6088 360/125.31 |
| 8,346,086 B2 * | 1/2013 | Suzuki | ................. | G02B 6/12026 398/79 |
| 8,482,472 B2 * | 7/2013 | Bankov | ................. | G03F 7/031 343/771 |

(Continued)

*Primary Examiner* — Andrew Jordan
(74) *Attorney, Agent, or Firm* — Donald R. Boys; Central Coast Patent Agency LLC

(57) ABSTRACT

A circular optical antenna array system is disclosed. The system includes a phase modulator configured to control an input phase of an input beam, and a polarization unit configured to feed the input beam in a predetermined input polarization mode. The system also includes a plurality of waveguide elements positioned in a predetermined configuration with a predetermined element spacing (D). Each waveguide element comprises a mirror inclined at a predetermined angle ($\theta°$) to generate a beam having an output polarization based on the predetermined configuration.

14 Claims, 15 Drawing Sheets

(56) References Cited

U.S. PATENT DOCUMENTS

| | | | |
|---|---|---|---|
| 8,705,325 B2 * | 4/2014 | Matsumoto | G11B 5/314 369/13.13 |
| 9,976,919 B2 * | 5/2018 | Rablau | G01L 1/242 |
| 10,168,501 B2 * | 1/2019 | Ashrafi | G02B 6/4246 |
| 10,298,317 B2 * | 5/2019 | Mertz | H04J 14/0212 |
| 10,409,004 B2 * | 9/2019 | Kulick | G02B 6/2938 |
| 10,591,802 B2 * | 3/2020 | Sun | G02F 1/2955 |
| 10,598,861 B2 * | 3/2020 | Kulick | G02B 6/43 |
| 11,035,993 B2 * | 6/2021 | Vasylyev | G02B 6/0068 |
| 11,194,085 B2 * | 12/2021 | Vasylyev | G02B 6/0018 |
| 11,245,471 B2 * | 2/2022 | Darbinian | G02F 1/292 |
| 11,258,994 B2 * | 2/2022 | Tanaka | H04N 9/3105 |
| 11,402,562 B2 * | 8/2022 | Vasylyev | G02B 6/0018 |
| 11,550,093 B2 * | 1/2023 | Vasylyev | G02B 6/0068 |
| 11,726,182 B2 * | 8/2023 | Singer | G02B 26/0833 356/5.01 |
| 2003/0091311 A1 * | 5/2003 | Lam | H01S 5/1082 385/129 |
| 2004/0071435 A1 * | 4/2004 | Okada | G02B 6/2817 385/146 |
| 2005/0046850 A1 * | 3/2005 | Chow | G01B 11/0625 356/430 |
| 2007/0065076 A1 * | 3/2007 | Grek | G02B 6/12026 385/37 |
| 2007/0223251 A1 * | 9/2007 | Liao | G02B 6/0061 362/615 |
| 2009/0115675 A1 * | 5/2009 | Bankov | G03F 7/029 343/776 |
| 2009/0185459 A1 * | 7/2009 | Matsumoto | G11B 5/6088 360/59 |
| 2010/0239211 A1 * | 9/2010 | Shiratori | G02B 6/4284 385/88 |
| 2010/0316385 A1 * | 12/2010 | Suzuki | G02B 6/12026 398/87 |
| 2011/0096639 A1 * | 4/2011 | Matsumoto | G11B 5/6088 |
| 2012/0302287 A1 * | 11/2012 | Wright | G08G 1/0965 340/933 |
| 2016/0282207 A1 * | 9/2016 | Rablau | G01L 1/242 |
| 2017/0045666 A1 * | 2/2017 | Vasylyev | G02B 6/0028 |
| 2017/0207531 A1 * | 7/2017 | Murakowski | H01Q 21/22 |
| 2018/0006372 A1 * | 1/2018 | Yu | H01Q 21/061 |
| 2019/0132052 A1 * | 5/2019 | Darbinian | H04B 10/11 |
| 2019/0219888 A1 * | 7/2019 | Sun | G02F 1/2955 |
| 2019/0250335 A1 * | 8/2019 | Kulick | G02B 6/12004 |
| 2019/0285965 A1 * | 9/2019 | Wang | G02F 1/1326 |
| 2020/0003955 A1 * | 1/2020 | Kulick | G02B 6/368 |
| 2020/0116832 A1 * | 4/2020 | Singer | G01S 7/4815 |
| 2020/0153094 A1 * | 5/2020 | Murakowski | H01Q 3/2676 |
| 2020/0183086 A1 * | 6/2020 | Sipes, Jr. | H01Q 21/068 |
| 2020/0379314 A1 * | 12/2020 | Hashiya | G02F 1/015 |
| 2020/0408884 A1 * | 12/2020 | Nakamura | G01S 7/4817 |
| 2021/0055694 A1 * | 2/2021 | Chan | G01S 7/4818 |
| 2021/0136335 A1 * | 5/2021 | Tanaka | H04N 9/3105 |
| 2021/0257729 A1 * | 8/2021 | Murakowski | H04R 9/08 |
| 2021/0265727 A1 * | 8/2021 | Murakowski | H01Q 21/20 |
| 2021/0302645 A1 * | 9/2021 | Vasylyev | G02B 6/0018 |
| 2021/0397027 A1 * | 12/2021 | Casset | G02F 1/2955 |
| 2022/0091321 A1 * | 3/2022 | Vasylyev | G02B 6/0018 |
| 2022/0137310 A1 * | 5/2022 | Nair | G02F 1/2955 385/31 |
| 2022/0146764 A1 * | 5/2022 | Morozov | G02B 6/34 |
| 2022/0229343 A1 * | 7/2022 | Kendrick | G02B 27/0087 |
| 2023/0341524 A1 * | 10/2023 | Singer | G01S 17/89 |

* cited by examiner

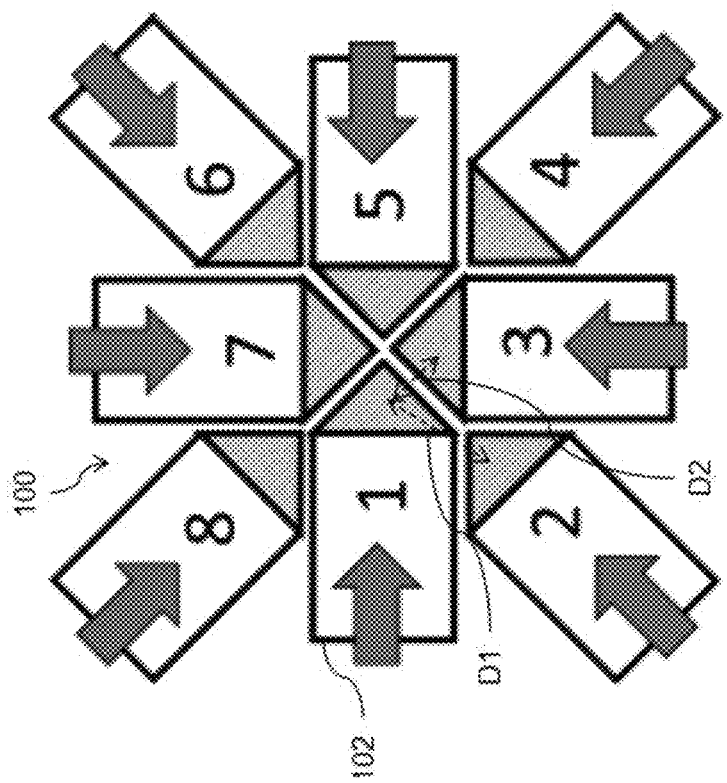
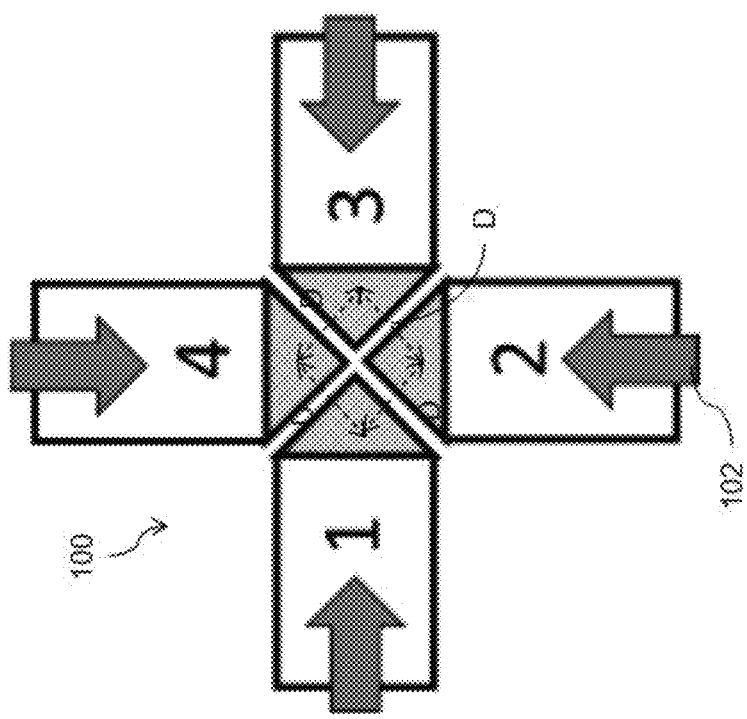
*Fig. 5B*
*Fig. 5A*

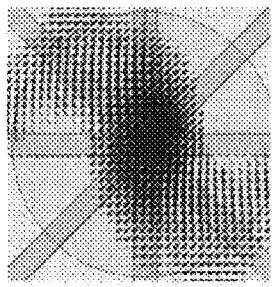 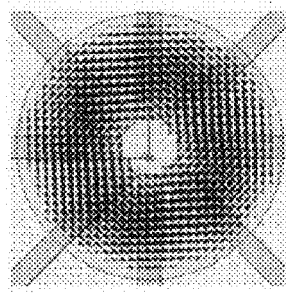 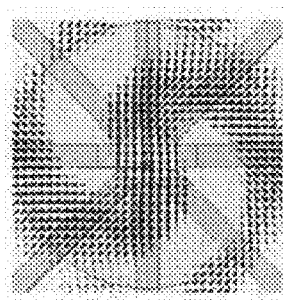
Fig. 13A    Fig. 13B    Fig. 13C
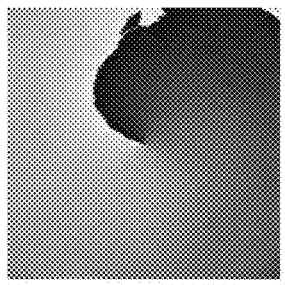 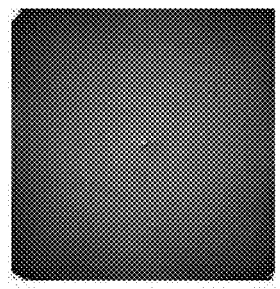 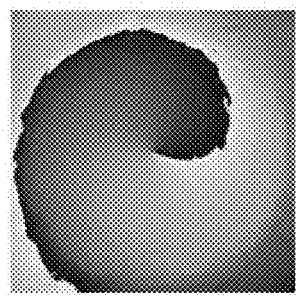
Fig. 12A    Fig. 12B    Fig. 12C
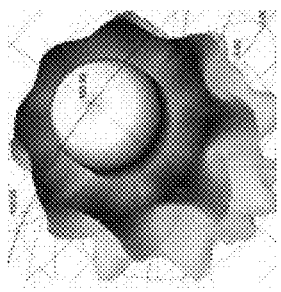 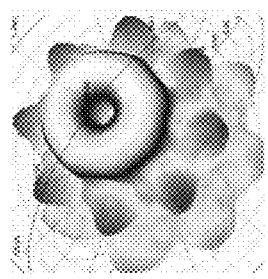 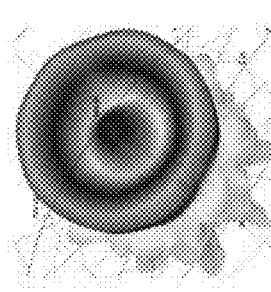
Fig. 11A    Fig. 11B    Fig. 11C

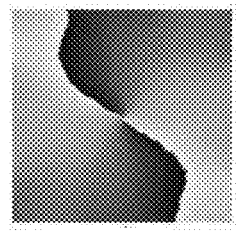 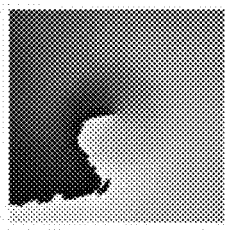 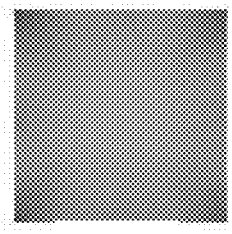 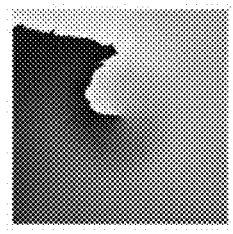
*Fig. 19A*  *Fig. 19B*  *Fig. 19C*  *Fig. 19D*
*Fig. 18A*  *Fig. 18B*  *Fig. 18C*  *Fig. 18D*
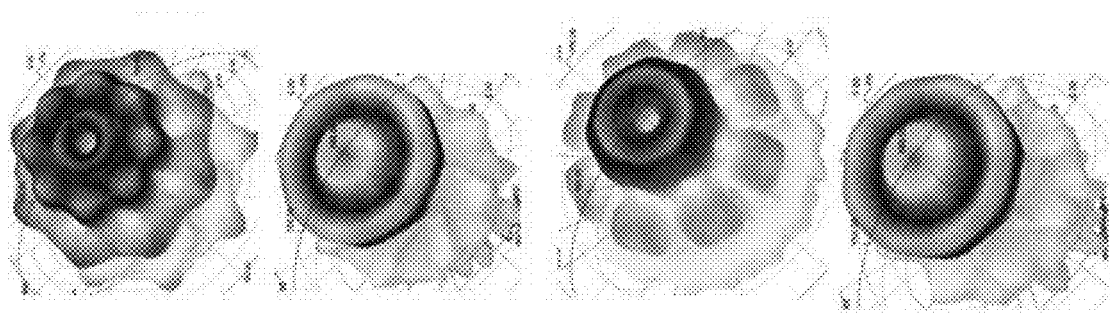
*Fig. 17A*  *Fig. 17B*  *Fig. 17C*  *Fig. 17D*

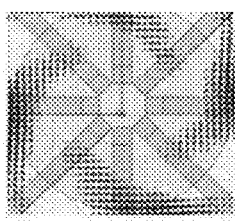 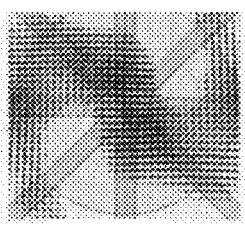 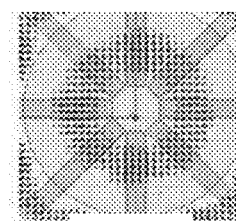 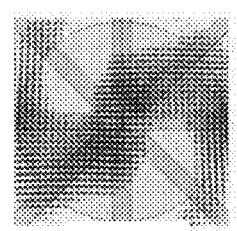
Fig. 22A  Fig. 22B  Fig. 22C  Fig. 22D
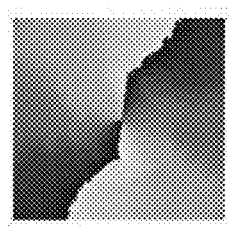 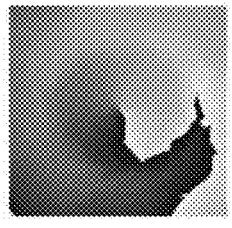 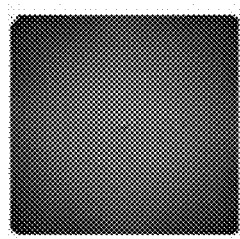 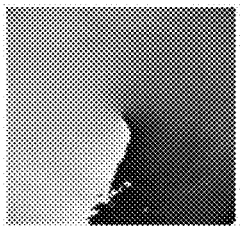
Fig. 21A  Fig. 21B  Fig. 21C  Fig. 21D
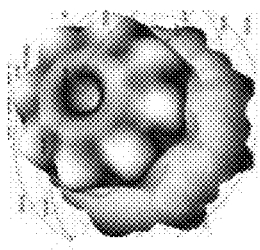 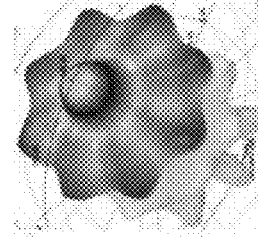 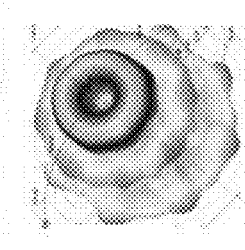 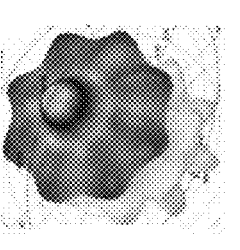
Fig. 20A  Fig. 20B  Fig. 20C  Fig. 20D

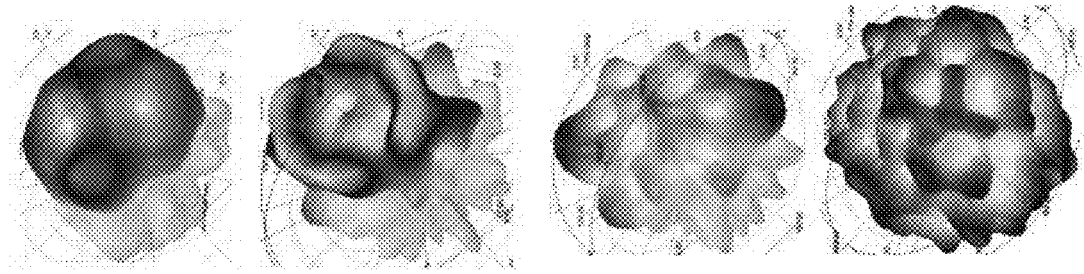
Fig. 24A  Fig. 24B  Fig. 24C  Fig. 24D
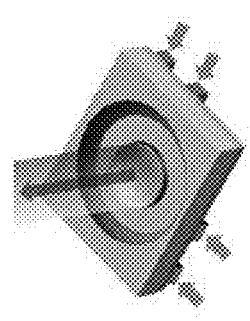 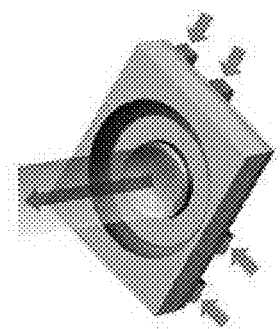 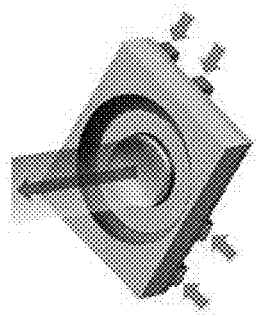 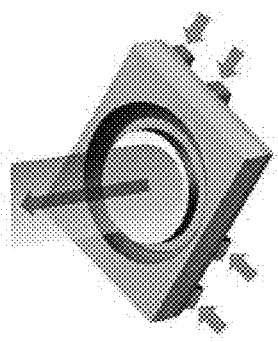
Fig. 23A  Fig. 23B  Fig. 23C  Fig. 23D

CIRCULAR OPTICAL ARRAY SYSTEM USING WAVEGUIDE FED ANGLED MIRRORS

CROSS-REFERENCES TO RELATED APPLICATIONS

The instant invention claims priority to India Patent Application 2020410348023 filed 3 Nov. 2020. All disclosure of the parent case is incorporated herein at least by reference.

FIELD OF THE INVENTION

The instant invention is in the technical area of optical antennae and, in particular, to circular optical arrays using waveguide fed angled mirrors.

DESCRIPTION OF THE RELATED ART

Vector optical beams have space-dependent polarization and vortex beams with circular symmetry and have orbital angular momentum (OAM). The beams are obtained by phase and polarization manipulation of coherent sources and have various applications including, but not limited to, high-speed optical communication, high-resolution imaging, laser machining, magnetism and particle manipulation. Generally, far-field pattern and polarization control is achieved in optical wavelengths using phase masks, nano-antennae, or sparse grating-based phased arrays. However, such systems produce non uniform polarization distribution and have limited capabilities. Some of the limitations include three-dimensional (3D) optical alignment of phase masks with Gaussian beams, inability to change angular momentum for a given wavelength, and very large size of grating-based antennas.

For instance, the existing phase masks and optical nano-antennae use excitation by Gaussian beams in a plane perpendicular to the phase mask or nano-antenna and hence require multiple optical components stacked to form a 3D structure. This makes two-dimensional (2D) integration with sources and modulators difficult. Phased arrays have successfully been used in radio frequency to produce vortex beams and optical phased antenna arrays using gratings may be completely integrated in 2D, however, the arrays consume large chip area and obtaining quarter-wave spacing is difficult. Further, as known in the art, ring resonators with gratings have shown radially and azimuthally polarized vector beams, but there is no provision to produce scalar vortices or changing the angular momentum of the beam at a given wavelength.

Further, element-to-element spacing is an important parameter which decides the fraction of power in the main far-field lobe. The spacing also decides the number and relative power in the side lobes. Generally, a spacing of $\lambda/4$ is ideal for phased arrays. However, achieving $\lambda/4$ spacing in dielectric waveguides is difficult due to the chances of coupling between adjacent waveguides and diffraction limit on the smallest possible waveguide size. Therefore, the available topologies are restricted. A typical grating coupler contains multiple periods of $\lambda/2$ sections. Thus, grating couplers inherently do not have $\lambda/4$ spacing due to their geometry. Moreover, sparse arrays are very large in size and the applications are mostly in beam steering.

Some of the publications related to the technology include heterogeneous 2D/3D photonic integrated microsystems (Ryan P. Scott) and Multicore Polymer Waveguides and Multistep 45° Mirrors for 3D Photonic Integration (Zhang et. al). WO2014104911A1 discloses method and apparatus for receiving electromagnetic beams with variable orbital angular momentum, OAM, states. US20200044349A1 discloses use of orbital angular momentum functions within full duplex communications to limit channel interference. However, the publications do not overcome the problems discussed earlier.

BRIEF SUMMARY OF THE INVENTION

A circular optical antenna array system is disclosed. The system includes a phase modulator configured to control an input phase of an input beam, and a polarization unit configured to feed the input beam in a predetermined input polarization mode. The system also includes a plurality of waveguide elements positioned in a predetermined configuration with a predetermined element spacing. Each waveguide element comprises a mirror inclined at a predetermined angle configured to generate an output beam having an output polarization based on the predetermined configuration.

In various embodiments, each one of the plurality of mirrors is a chisel edge mirror or a pointed tip mirror. In some embodiments, the phase modulator and the polarization unit are connected to the waveguide elements on a chip using a planar process. In some embodiments, each one of the plurality of waveguide elements comprises an output window having one or more lenses and antireflection coating. In some embodiments, the predetermined configuration comprises a circular arrangement of the plurality of waveguide elements.

In various embodiments, the predetermined input polarization mode is one of transverse electric like (TEL) mode, transverse magnetic like (TML) mode, or a linear combination of TEL and TML mode. In some embodiments, the output polarization is one of a linear polarization if the predetermined input polarization is a linear combination of TEL and TML modes; azimuthal polarization if the predetermined input polarization is a TE mode; a radial polarization if the predetermined input polarization is a TM mode, and circular polarization if the predetermined input polarization comprises a 90° phase shift between two orthogonal polarizations. In some embodiments, the angular momentum of the output beams is generated by providing incremental input phase. In some embodiments, the predetermined configuration and the predetermined element spacing reduce the sideband power in far-field pattern. In various embodiments, the system includes a dome structure on top of the array elements, wherein the dome structure is configured to increase the directionality of the beam. In various embodiments, the predetermined angle is 45°. In some embodiments, the predetermined element spacing is one of a sub-wavelength element spacing or a non-sub-wavelength element spacing, wherein the sub-wavelength element spacing is in range from 15 nm to 1550 nm. In various embodiments, the invention discloses a transmitter-receiver incorporating a first circular array antenna system configured to operate as transmitter and a second circular antenna array system configured to operate as receiver.

According to another embodiment, a method of generating vortex or non-vortex beams using a circular optical array is disclosed. The method includes receiving an input beam having one or more input characteristics. The input characteristics are controlled by varying an input phase and a predetermined input polarization mode of the input beam. The input beam is then fed to a plurality of waveguide elements positioned in a predetermined configuration with a predetermined element spacing D. Each waveguide element comprises a mirror inclined at a predetermined angle θ°. Next, the method includes generating an output beam having an output polarization based on the predetermined configuration.

BRIEF DESCRIPTION OF THE DRAWING FIGURES

FIG. 5A-FIG. 5E illustrate array geometries of the system, according to various embodiments of the present invention.

FIG. 11A-FIG. 11C illustrate far-field patterns for circular polarization, according to one example of the present invention.

FIG. 12A-FIG. 12C illustrate radiating field phase for circular polarization, according to one example of the present invention.

FIG. 13A-FIG. 13C illustrate radiating electric field vectors for circular polarization, according to one example of the present invention.

FIG. 17A-FIG. 17D illustrate far-field patterns for azimuthal polarization, according to one example of the present invention.

FIG. 18A-FIG. 18D illustrate radiating field phase for azimuthal polarization, according to one example of the present subject matter.

FIG. 19A-FIG. 19D illustrate radiating electric field vectors for azimuthal polarization, according to one example of the present subject matter.

FIG. 20A-FIG. 201D illustrate far-field patterns for radial polarization, according to one example of the present subject matter.

FIG. 21A-FIG. 21D illustrate radiating field phase for radial polarization, according to one example of the present subject matter.

FIG. 22A-FIG. 22D illustrate radiating electric field vectors for radial polarization, according to one example of the present subject matter.

FIG. 23A-FIG. 23D illustrate various geometries of the output window, according to one example of the present subject matter.

FIG. 24A-FIG. 24D illustrate far-field patterns for each structural window, according to one example of the present subject matter.

Referring to the drawings, like numbers indicate like parts throughout the views.

DETAILED DESCRIPTION OF THE INVENTION

Figure 1A:
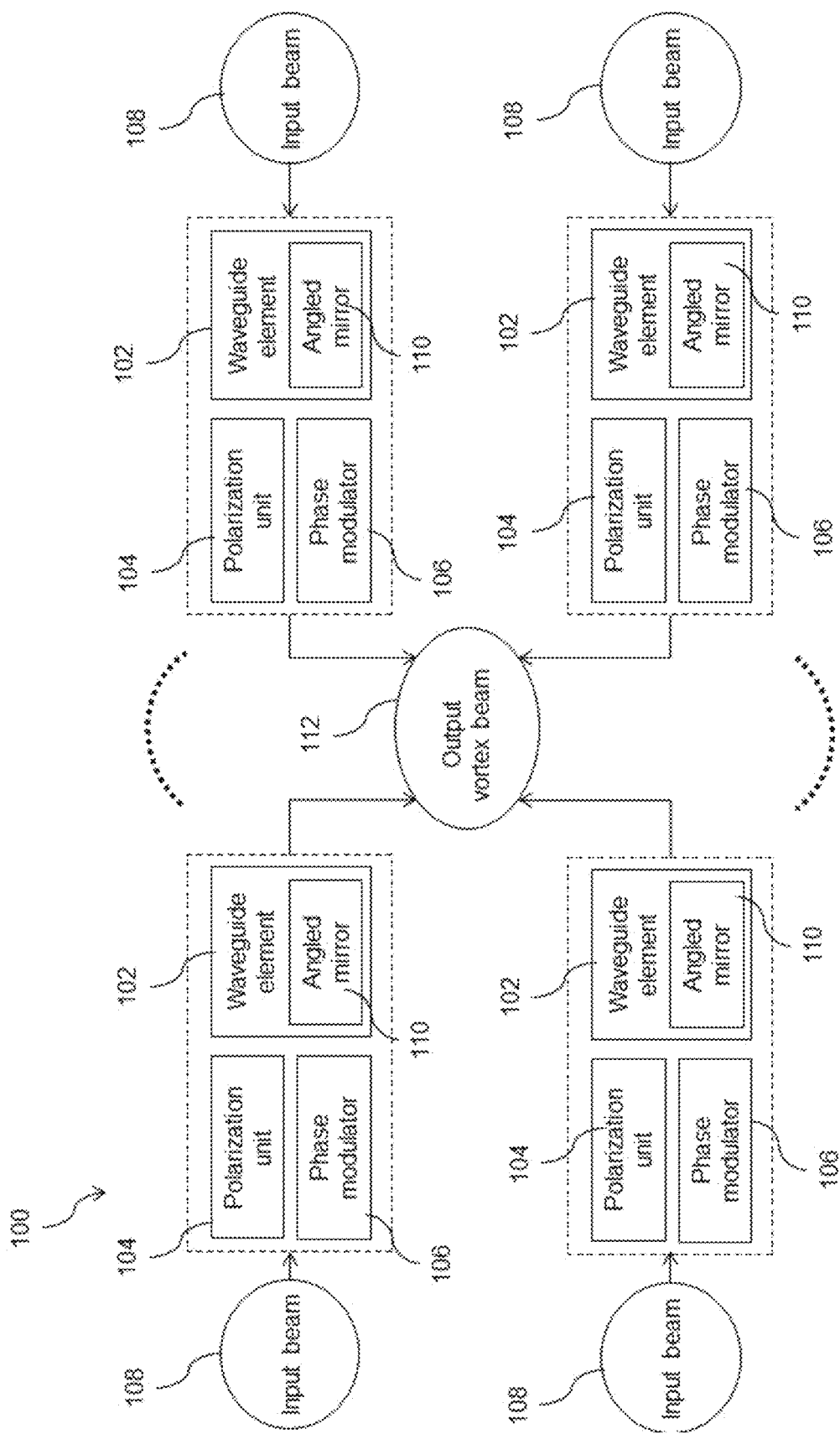
FIG. 1A illustrates a block diagram of a circular optical antenna array system for generating optical scalar and vector vortices, according to one embodiment of the present invention.

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The present subject matter describes a circular optical antenna array system for generating optical beams.

Figure 1B:
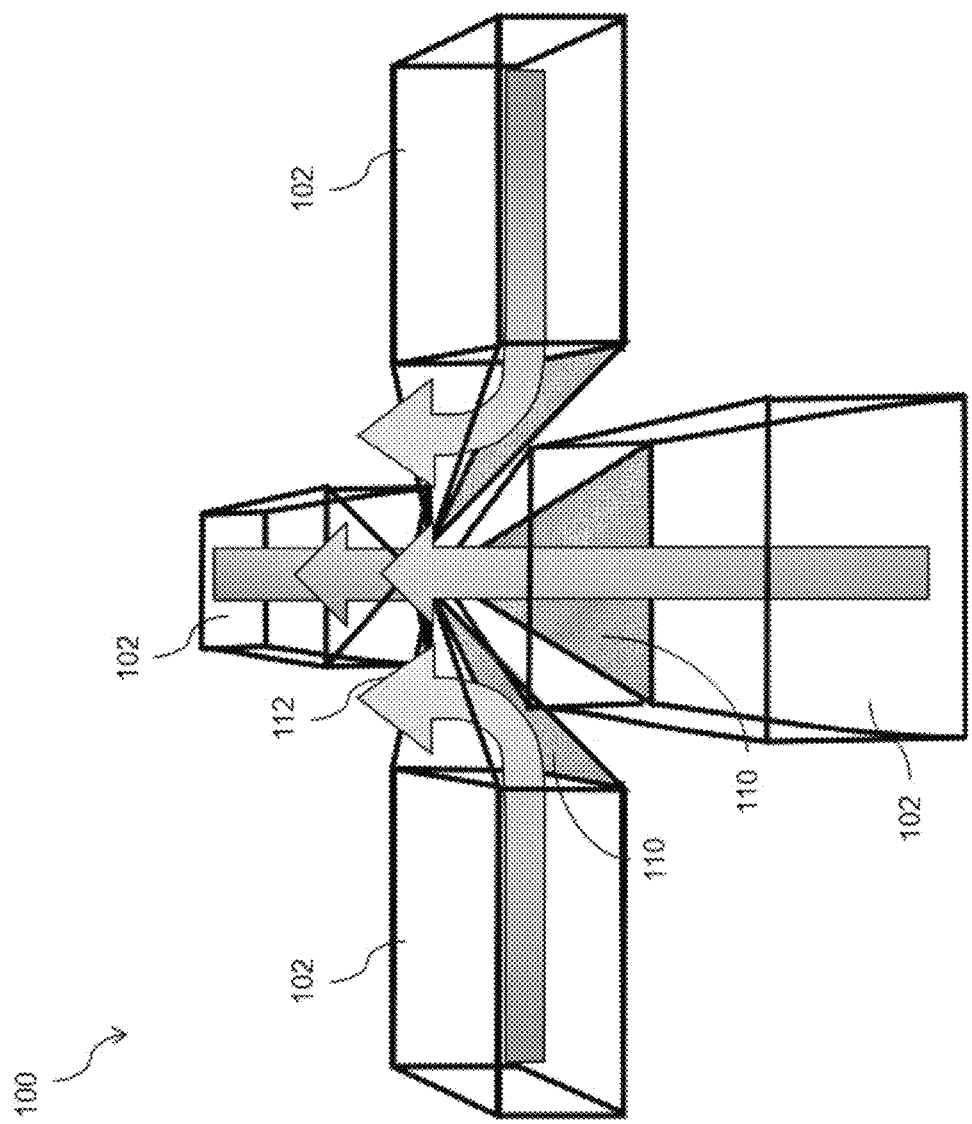
FIG. 1B illustrates a circular optical antenna array system for generating optical scalar and vector vortices, according to one embodiment of the present invention.

A block diagram and side view of a circular optical antenna array system for generating optical scalar and vector vortices is illustrated in FIG. 1A. and FIG. 1B, according to one embodiment of the present subject matter. The system 100 may primarily include a plurality of waveguide elements 102-N, a polarization unit 104, and a phase modulator 106. The system may receive input beams from one or more coherent light sources. The phase modulator 106 may be configured to control an input phase of the input beam 108. The polarization unit 104 may be configured to feed the input beam 108 to the waveguide element in a predetermined input polarization mode.

The plurality of waveguide elements 102 may be positioned in a predetermined configuration with a predetermined element spacing D. In some embodiments, the predetermined configuration may include a circular arrangement of the plurality of waveguide elements in a planar array, as shown in FIG. 1B and in FIG. 5A, wherein a linear axis of each waveguide element, along which a light beam is guided, is directed toward a common point, that being the center of the circle. The predetermined element spacing D may be the spacing between each waveguide element 102. In some embodiments, the predetermined element spacing D may be a sub-wavelength element spacing or a non-sub-wavelength spacing, i.e., larger spacing. In various embodiments, the sub-wavelength element spacing may be in a range from 15-1550 nm. Each waveguide element 102 may include a mirror 110 inclined at a predetermined angle to generate an output beam 112 comprising parallel beams produced by the waveguides, having an output polarization based on the predetermined configuration. In various embodiments, the predetermined element spacing may be a separation between peak intensity points in mode center in adjacent mirrors in each waveguide element 102. In some embodiments, the minimum element spacing may be based on minimum feature size of fabrication and the minimum thickness of the mirror below which the mirror becomes transparent. In various embodiments, the predetermined angle may be 45°. The output beam may be a vortex beam or a non-vortex beam. In some embodiments, the output polarization is one of a linear polarization, azimuthal polarization, radial polarization, or circular polarization.

In various embodiments, each one of the plurality of mirrors 110 may be a chisel edge mirror or a pointed tip mirror. In some embodiments, the phase modulator 106 and the polarization unit 104 may be connected to the waveguide elements 102 on a chip using a planar process. In some embodiments, each one of the plurality of waveguide elements 102 may include an output window (not shown in figure) having one or more lenses and antireflection coating.

In various embodiments, the predetermined input polarization mode is one of transverse electric like (TEL) mode, transverse magnetic like (TML) mode, or a linear combination of TEL and TML mode. In some embodiments, the angular momentum of the output beams may be controlled based on the input phase. In some embodiments, the predetermined configuration and the predetermined element spacing D may reduce the sideband power in far-field pattern. In some embodiments, the predetermined element spacing D, may be the distance between centers or centroids of the angled mirrors in the waveguide elements 102.

Figure 2:
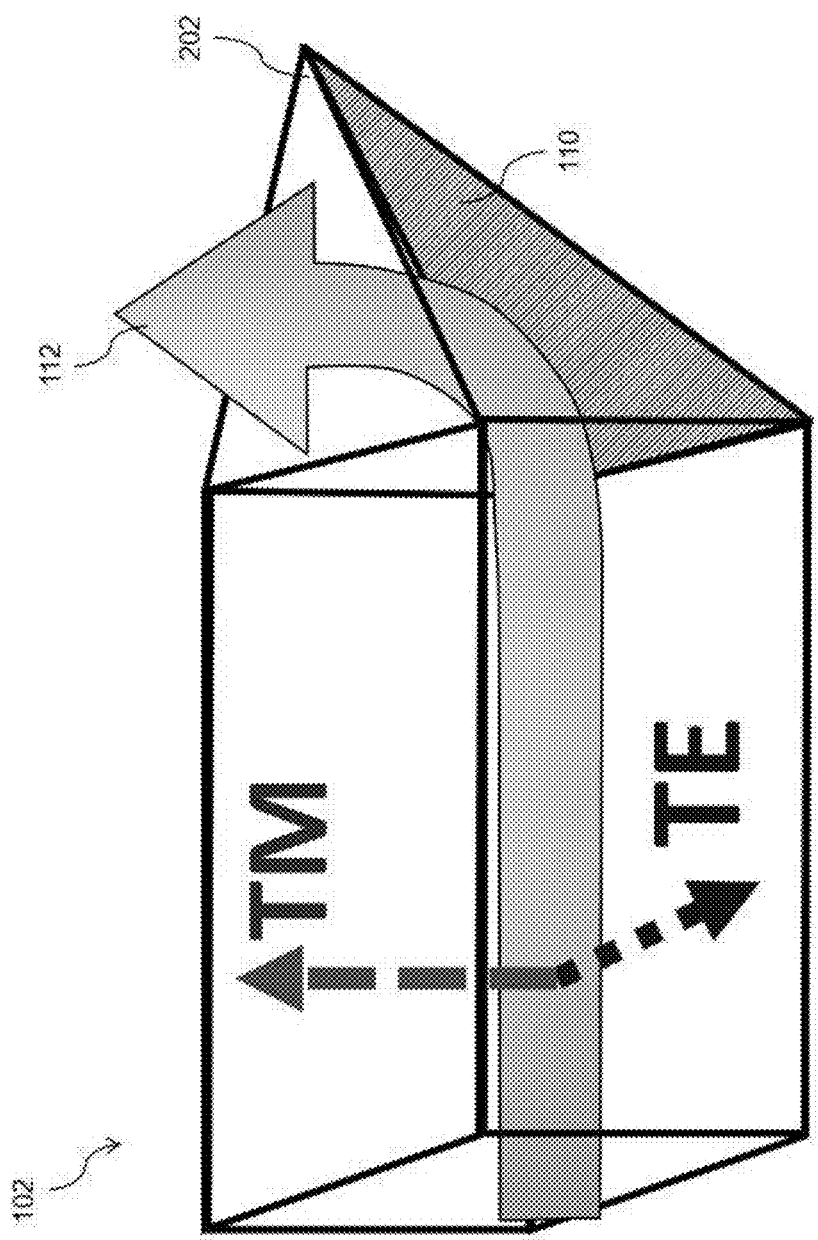
FIG. 2 illustrates a waveguide element, according to one embodiment of the present invention.

The structure of the waveguide element 102 is illustrated in FIG. 2, according to various embodiments of the present subject matter. The waveguide element 102 may be a single-mode waveguide fed 45° angled mirror (WAM) with a pointed tip 202. The waveguide may be in silicon on insulator (SOI) chip.

In various embodiments, the predetermined angle of inclination of the mirror may be 45°. In some embodiments, the mirror may be developed by alkaline etching of silicon and oriented along a {110} plane. Alternatively, other orientations may also be developed by using isotropic etching through a square or hexagonal aperture. Silver deposited on the tapered tip of the waveguide 102 may provide high reflectivity. In various embodiments, the electric fields inside a waveguide 102 along X and Y direction respectively are shown as TE like (TEL) and TM like (TML) modes. TE like waveguide mode has 0 as the polarization angle while TM like mode has 90°. Using a simplified plane wave reflection model, the reflected beam's electric field $\vec{E}_r$ may be modeled as $$\vec{E}_r = \frac{E_{i0}}{\sqrt{2}}(\hat{a}'_m - \hat{a}_m)e^{-j\vec{k}_r \cdot (\vec{r}-\vec{r}_m)} \quad \text{(for } TE\text{)} \quad (1)$$

$$\vec{E}_r = -E_{i0}(\hat{a}_m \times \hat{a}'_m)e^{-j\vec{k}_r \cdot (\vec{r}-\vec{r}_m)} \quad \text{(for } TM\text{)} \quad (2)$$

where, $E_{i0}$ is the incident electric field amplitude, $\hat{a}_m$ is the unit vector normal to the mirror, $\hat{a}_m'$ is the unit vector obtained by rotating $\hat{a}_m$ by 90° in the plane of incidence. $r_m$ is the position vector of the point where the beam center intersects the mirror. The reflected output beam's wave vector may be given as $$\frac{\vec{k}_r}{|\vec{k}_r|} = \frac{1}{\sqrt{2}}(\hat{a}'_m + \hat{a}_m) \quad (3)$$

Figure 3:
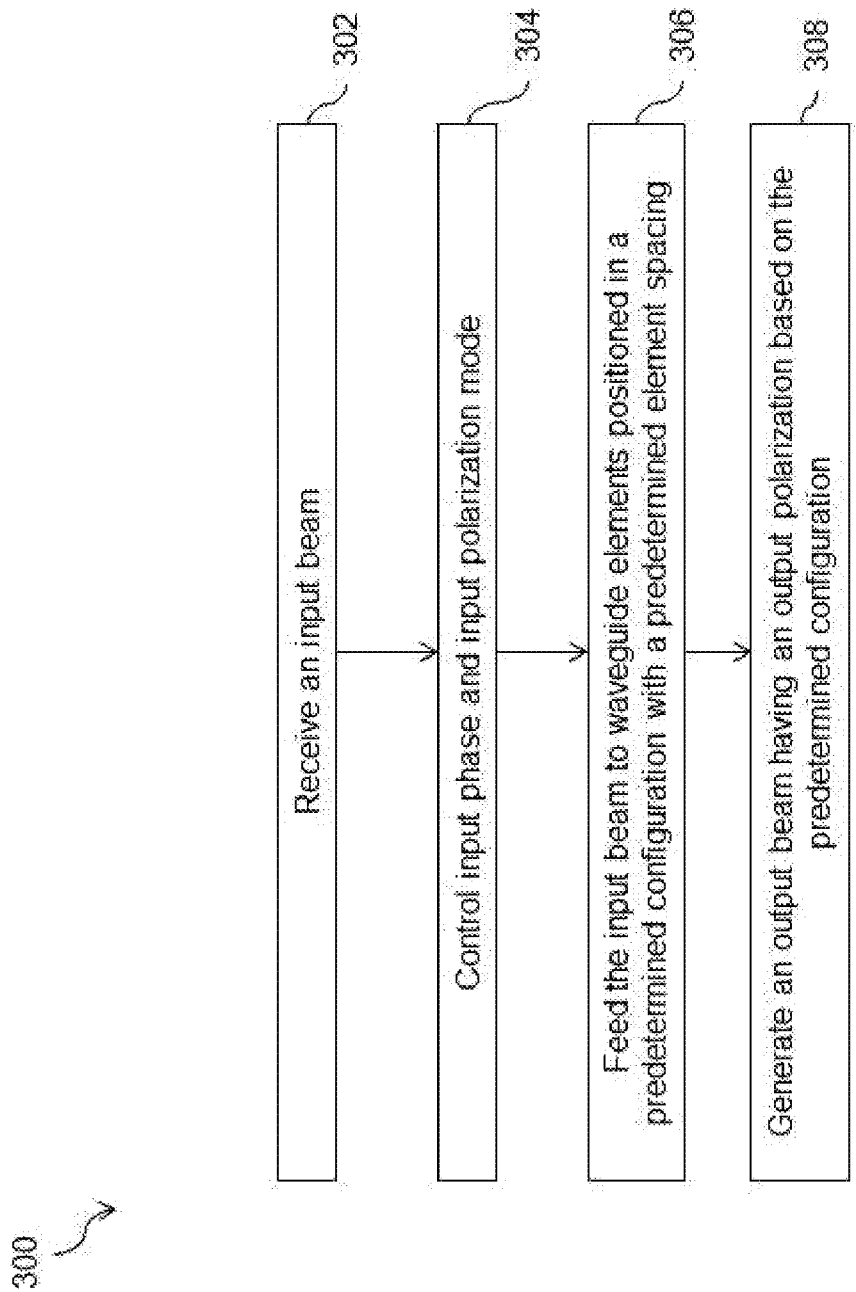
FIG. 3 illustrates a flow diagram of a method of generating vortex or non-vortex beams using a circular optical array, according to one embodiment of the present invention.

A flow diagram of a method of generating vortex or non-vortex beams using a circular optical array is illustrated in FIG. 3, according to an embodiment of the present subject matter. The method includes receiving an input beam having one or more input characteristics at block 302. The input characteristics are controlled by varying an input phase and a predetermined input polarization mode of the input beam at block 304. The input beam is then fed to a plurality of waveguide elements positioned in a predetermined configuration with a predetermined element spacing D. Each waveguide element comprises a mirror inclined at a predetermined angle θ°, such as 45°. Next, the method includes generating an output beam having an output polarization based on the predetermined configuration. In some embodiments, the predetermined angle may be varied to control beam divergence for producing converging or diverging beams.

Figure 4B:
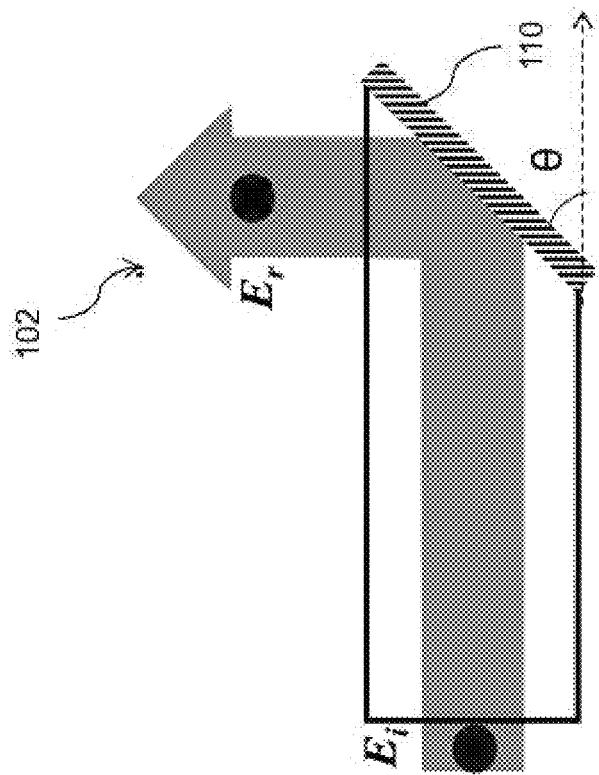
FIG. 4A and FIG. 4B illustrate relationships between input and output polarizations, according to one embodiment of the present invention.
Figure 4A:
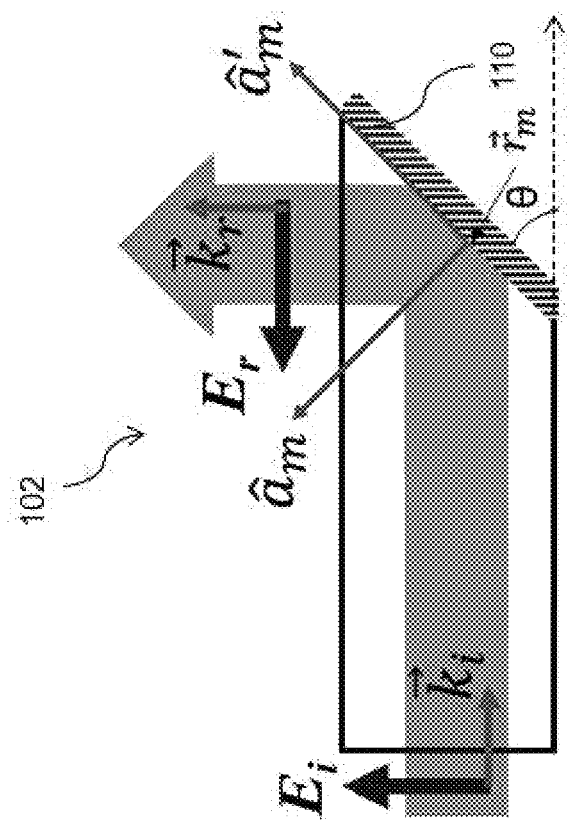

The relation between input and output polarisations are illustrated in FIG. 4A and FIG. 4B, according to various embodiments of the present subject matter. The figures illustrate how the electric polarization of the input mode is related to the output mode after reflecting from the mirror inclined at the predetermined angle θ°. In various embodiments, the predetermined angle θ° may be 45°. In some embodiments, for an input TE like mode (TEL) with an electric field nearly parallel to the mirror, the output field may be perpendicular to the axis of the feeding waveguide. In some embodiments, for an input TM like (TML) mode, the output polarization may be along the axis of the feeding waveguide 102. For a waveguide with axis along some X or Y coordinate axes, X or Y output polarization may be obtained by using a single TEL or TML mode. For input waveguide axis oriented in a direction other than the X or Y axes, a suitable linear combination of TEL and TML modes may produce the desired output X or Y polarization.

Figure 5E:
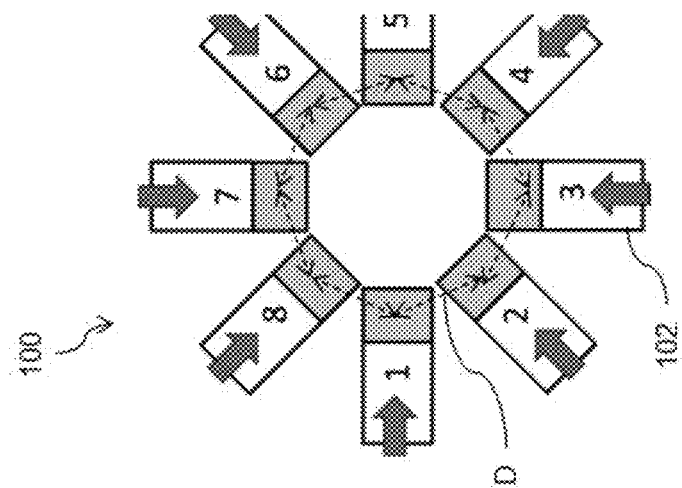
Figure 5D:
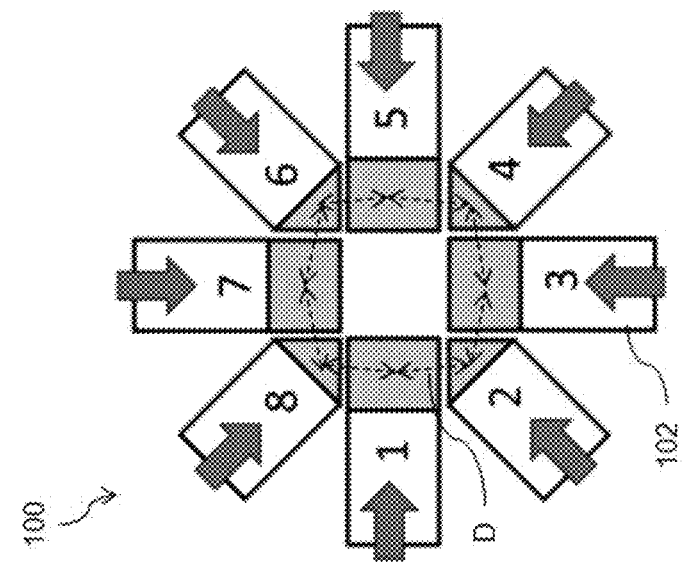
Figure 5C:
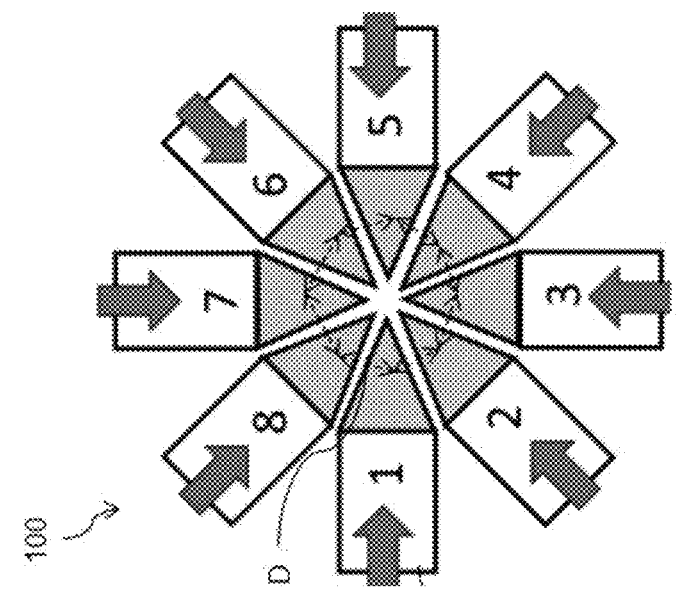

The various configurations of the optical array system is illustrated in FIG. 5A to FIG. 5E, according to various embodiments of the present subject matter. A four-element optical array system is illustrated in FIG. 5A and different configurations for eight element array system are illustrated in FIG. 5B-FIG. 5E. An eight-element array with four elements kept in the corners of the 4-element array is illustrated in FIG. 5B. An eight-element array with all pointed mirrors is illustrated in FIG. 5C. An eight-element array with four pointed and four chisel edge mirrors is illustrated in FIG. 5D. An eight-element array with all chisel edge mirrors is illustrated in FIG. 5E.

In various embodiments, the configurations as shown vary in predetermined element spacing D. In FIG. 5A and FIG. 5C, the predetermined element spacing D may be the centroidal distance between the triangular shaped mirrors. In some embodiments, the predetermined element spacing D may include a first spacing D1 and a second spacing D2 between the mirrors as shown in FIG. 5B. Alternatively, the predetermined element spacing D may be the separation between the peak intensity points in output modes emanating from the adjacent mirrors. The predetermined element spacing D may be varied to change the quality of beam produced in terms of the sideband powers in the far-field pattern. Low sideband power ensures maximum power delivered in the intended beam. The different arrays shown in the figures may have different symmetries and have a direct bearing on the symmetry of the emitted output beam. In some embodiments, a single dome structure may be provided on top of the array, in the substrate side. The dome structure may allow increase in the directionality of the beam. The dome may be fabricated by a standard micro-lens process. Better planar process compatibility may be achieved using sub-wavelength binary lens.

Figure 6A:
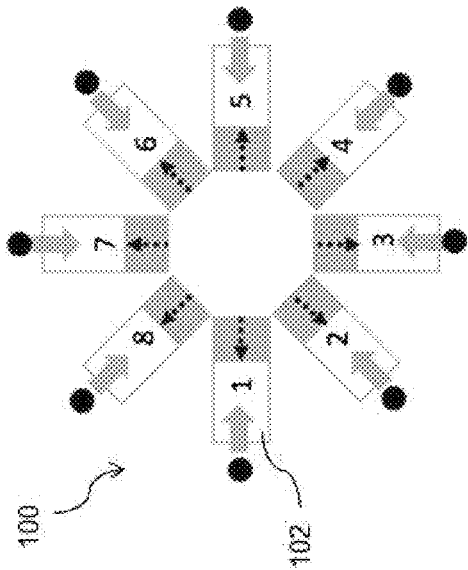
FIG. 6A-FIG. 6D illustrate input and output polarization patterns, according to various embodiments of the present invention.
Figure 6B:
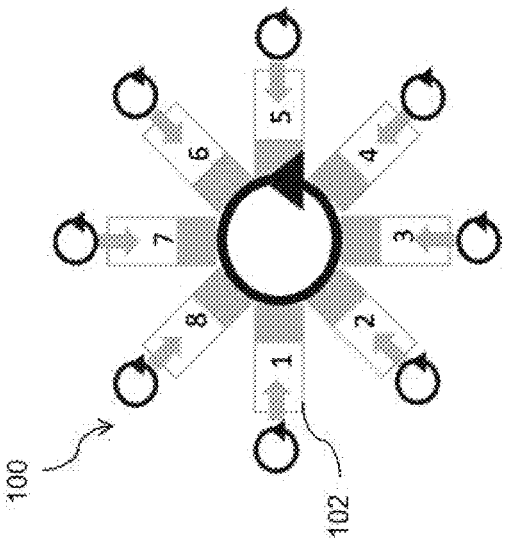
Figure 6C:
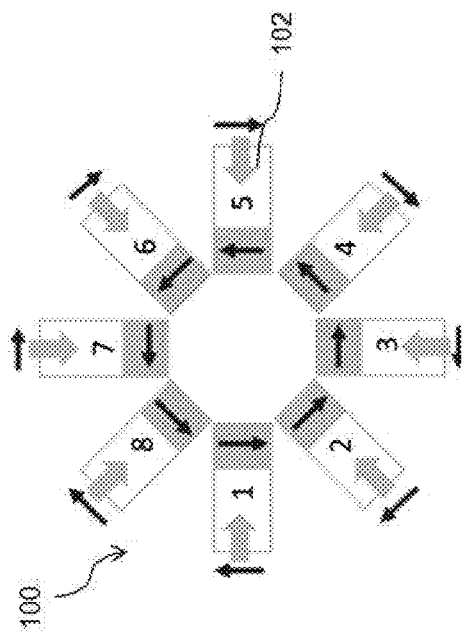
Figure 6D:
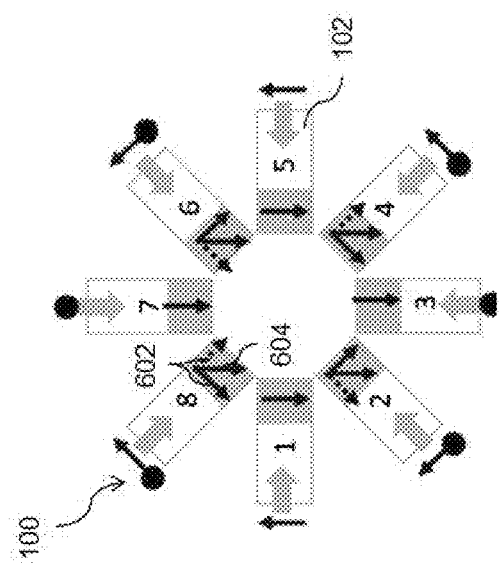
Figures 8A, 8B, 8C, 8D, 8E:
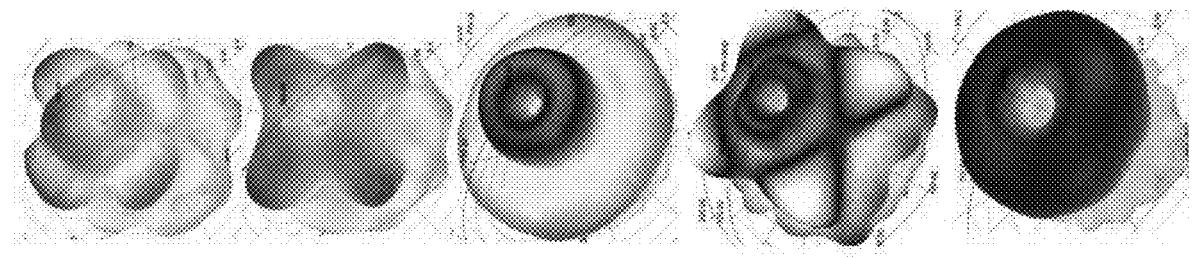
FIG. 8A-FIG. 8E illustrate radiation pattern emanating from the array for azimuthal polarization, according to one example of the invention.

Various input polarizations and phase patterns from eight element optical array system is illustrated in FIG. 6A-FIG. 6D, according to various embodiments of the present subject matter. FIG. 6A illustrates azimuthal vector beam produced using the eight-element array system. FIG. 6B illustrates radial vector beam produced using the eight-element array system. FIG. 6C illustrates linear polarized vector beam produced using the eight-element array system. The output modes excited by TEL and TML modes are shown with continuous line and dotted line arrows respectively. The output field components are shown in 602 and the resultant is shown in 604. The spin angular momentum may be generated by rotating the electrical vector in the azimuthal plane. This may be achieved in a circular array by exciting the waveguides with circular polarization as shown in FIG. 6D. The pre-compensation of polarization rotation clue to the circular arrangement may be represented by the offset of arrowhead with respect to the waveguide input.

Spin may also be excited by using linear polarization in the feed waveguides. For example, if the waveguides 102-1,5 in FIG. 6A have TEL modes with opposite phases and the waveguides 102-7,8 have TML modes with opposite phases, then the two waveguide pairs may excite orthogonal polarizations in the output beam. In some embodiments, a 90° phase shift between the two orthogonal polarizations may produce a circular polarization in the output. In either case, there are two degrees of freedom in circularly polarized modes, i.e., the spin s and orbital angular momentum l. In various embodiments, the spin angular momentum may be controlled by the phase lag $\theta_P$ between the TEL and TML polarizations of each waveguide. The orbital angular momentum may be controlled by the total feed phase D. The resulting electric field of the $n^{th}$ element may be modeled as $$E_{y,n} = E_{y,n,0} \cos\left(\omega t - kz - \frac{n\Phi}{N} - \theta_P - \frac{n360°}{N}\right) \quad (4)$$

$$E_{x,n} = E_{x,n,0} \cos\left(\omega t - kz - \frac{n\Phi}{N} - \frac{n360°}{N}\right) \quad (5)$$

where, $E_{y(x),n,0}$ are the amplitudes of the y(x) components in an N element array and kz is the phase acquired due to the distance from the element mirror. The last n 360°/N phase term is the phase added by the circular geometry of the array that may be represented by the offset of the arrowhead of the right hand circularly polarized symbol in FIG. 6D. The phase results in the diametrically opposite elements cancelling each other's radial field components at the beam center, when $\Phi=0$. A pre-compensation by subtracting $\pm n \times 360°/N$ phase from the input feeds may produce a circularly polarized output. The ± depends on whether the feed is a right/left hand circularly polarized (RHCP/LHCP), respectively.

Orbital angular momentum may be generated by providing incremental phase for a particular beam of light in each azimuthal position in the array by providing incremental phase to the input feed waveguides. A counter-clockwise increment of phase by 360°/N in adjacent element may provide 360° total phase increment for RHCP. A counter-clockwise 720° total feed phase may provide an orbital angular momentum of l=+1. A total counter clockwise array phase increment of $\Phi=(1-1)\times 360$ may provide an orbital angular momentum of 1.

In some embodiments, the vortex beam with circular polarization may also be obtained as a linear combination of vector vortices viz. radial and azimuthal polarization. In scalar vortex beams, the entire angular momentum may contribute to the orbital angular momentum charge.

In various embodiments, the invention discloses a transmitter-receiver incorporating the circular array antenna system 100 as disclosed herein. The transmitter-receiver may include a first circular array antenna system 100, configured to operate as transmitter and a second circular antenna array system 100 configured to operate as receiver.

EXAMPLES

Example Results

The wavelength used in the simulation study was chosen as 1550 nm for telecom compatibility and less susceptibility to plasma resonance in silver. The waveguides were 400 nm×400 nm in cross-section and the $SiO_2$ layer of SOI wafer was 500 nm thick. Different modes of the beam were obtained by tuning the phase, amplitude, and polarization of each of the incoming waveguides. The fraction of power delivered to the main beam and the symmetry of the beam were visualized and quantified using the far-field characteristics. The purity of the particular vortex mode was visualized using the field vectors in the near field. The field simulation was performed using High Frequency Electromagnetic Field Simulation (HFSS). The electric field values were exported from HFSS and the different angular momentum values were obtained separately.

Example 1: Polarization Control

Figures 7A, 7B, 7C, 7D, 7E:
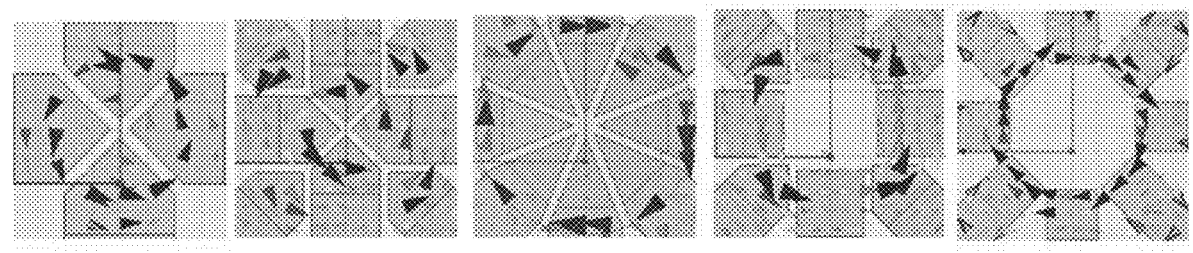
FIG. 7A-FIG. 7E illustrate field vectors emanating from the array for azimuthal polarization, according to one example of the present invention.
Figures 10A, 10B, 10C, 10D, 10E:
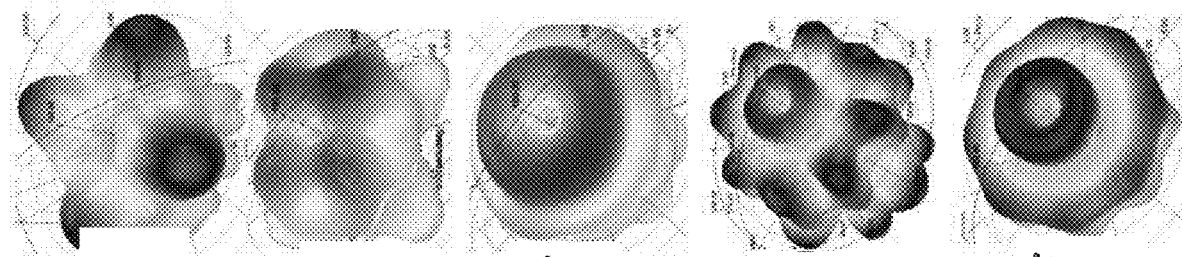
FIG. 10A-FIG. 10E illustrate radiation pattern emanating from the array for azimuthal polarization, according to one example of the present invention.
Figures 9A, 9B, 9C, 9D, 9E:
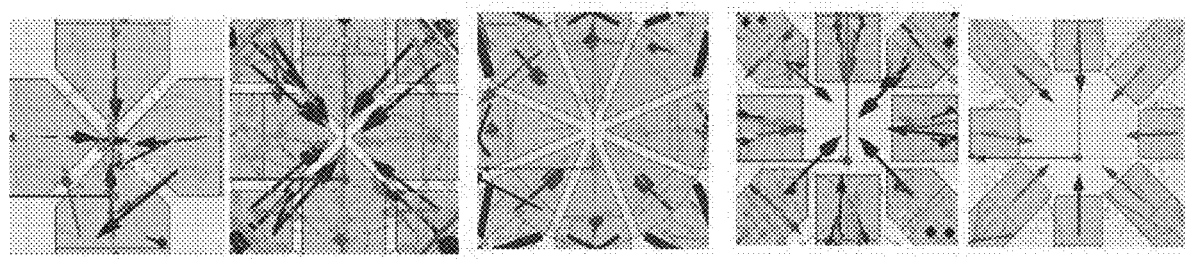
FIG. 9A-FIG. 9E illustrate radiation pattern emanating from the array for radial polarization, according to one example of the present invention.

The near-field emanating from the array is a linear combination of all the components excited by each waveguide with angled mirror. The polarization rules as discussed earlier were validated using the simulation results. The radiation pattern and field vectors emanating from the array are shown for azimuthal polarization in FIG. 7A-7E and FIG. 8A-8E and for radial polarization in FIG. 9A-9E and FIG. 10A-10E. The different array geometries considered in FIG. 5A-5E were compared. FIG. 7A and FIG. 9A illustrate the field vectors emanating from four element array system, FIG. 7B and FIG. 9B illustrate field vectors emanating from the eight element array system with four elements kept in the corners of the 4-element array, FIG. 7C and FIG. 9B illustrate field vectors emanating from an eight element array with all pointed mirrors, FIG. 7D and FIG. 9D illustrate field vectors emanating from an eight element array with four pointed and four chisel edge mirrors, FIG. 7E and FIG. 9E illustrate field vectors emanating from an eight element array with all chisel edge mirrors. The far-field patterns for each array configurations for azimuthal polarizations are illustrated FIG. 8A-FIG. 8E. The far-field patterns for each array configurations for radial polarizations are illustrated FIG. 10A-FIG. 10E. The structures with better rotational symmetry illustrated in FIGS. 5C and 5E were considered as they produced better symmetry in the radiation patterns as well. Both the structures provided a gain of approximately 10 dB for the main beam, in both azimuthal and radial polarization. While other structures were also useful due to fabrication convenience in some cases, the geometries shown in FIG. 5C-5E produced good gain and symmetry. The results were obtained with an epoxy lens having radius r=1.6 μm in the emitting window.

Example 2: Angular Momentum Control

Spin charge values of s=±1 corresponds to right hand circularly polarized RHCP and left hand circularly polarized LHCP, respectively. The s values was provided by $\theta_P/90°=\pm1$, respectively. Even multiples of $\theta_P/90°$ produced linear polarizations, and so does $\theta_P/90°=0$. If ($\Phi/360°$, $\theta_P/90°$)=(0 to ±2, ±1) is considered, there are 15 possible combinations. Hence for illustration ($\Phi/360°$, $\theta_P/90°$)=(0 to ±1, 1) is shown in FIG. 11-13. The array configuration in FIG. 5E was studied with an epoxy lens of 2.4 μm radius. FIG. 11A, FIG. 12A, FIG. 13A illustrate the far-field patterns, radial field phase, and radiating electric field vectors for $\Phi=-1\times360°$. The spin angular momentum s was measured as −0.4174, the orbital angular momentum was measured as =−0.7069, and t=−1.1244. Similarly, FIG. 11B, FIG. 12B, FIG. 13B illustrate the far-field patterns, radial field phase, and radiating electric field vectors for $\Phi=0°$. The spin angular momentum s was measured as −1.2198, the orbital angular momentum was measured as l=−0.6974, and t=−0.5223. Further, FIG. 11C, FIG. 12C, FIG. 13C illustrate the far-field patterns, radial field phase, and radiating electric field vectors for $\Phi=1\times360°$. The spin angular momentum s was measured as −0.5972, the orbital angular momentum was measured as =1.5258, and t=0.9286.

The detailed angular momentum data is presented in a tabular form. In the absence of spin and orbital contributions from beam center and polarization distribution, respectively, the ($\Phi/360°$, $\theta_P/90°$) values should have mapped directly to (1-1) and s values, respectively, for RHCP (and vice versa). But there was an inevitable central-field to spin, and polarization-distribution to OAM conversion, resulting in the s, l, and t values shown in Table 1. Additionally, $\Phi/360°$ maps to (1-1) since there is a feed phase added by the circular arrangement of the array elements. The effect of the phase due to the geometry was seen FIG. 9B which shows an azimuthal vector field with a positive orbital angular momentum l when $\Phi/360°=0$. Conversely, $\Phi/360°=\pm1$ gives maximum power at beam center for $\theta_P/90°=\pm1$, respectively. Such high intensity in the center is characteristic of a scalar beam or circular polarization with no orbital angular momentum. Further, the beams with the same nonzero $\Phi/360°\times\theta_P/90°$ have very similar |s| and |l| values.

TABLE 1

Table of s, l, t = s + l values showing the relation with normalized feed phase values ($\Phi/360°$, $\theta P/360°$)

| | | | $\Phi/360°$ | | | |
|---|---|---|---|---|---|---|
| $\theta_P/90°$ | | −2 | −1 | 0 | +1 | +2 |
| +1 | s | −0.2264 | 0.6017 | 1.2200 | 0.4029 | 0.6401 |
| | l | −2.0263 | −1.5242 | −0.6989 | 0.7128 | 1.3770 |
| | t | −2.2527 | −0.9225 | 0.5211 | 1.1156 | 2.0171 |
| 0 (linear) | s | −0.1779 | −0.3321 | −0.0208 | −0.3640 | 0.1698 |
| | l | −1.6578 | −0.9935 | 0.0180 | 1.0101 | 1.6556 |

TABLE 1-continued

Table of s, l, t = s + l values showing the relation with normalized feed phase values ($\Phi/360°$, $\theta P/360°$)

| | | | $\Phi/360°$ | | | |
|---|---|---|---|---|---|---|
| $\theta_P/90°$ | | −2 | −1 | 0 | +1 | +2 |
| | t | −1.8357 | −0.6614 | −0.0027 | 0.6461 | 1.8254 |
| −1 | s | −0.6447 | −0.4174 | −1.2198 | −0.5972 | 0.2132 |
| | l | −1.3843 | −0.7069 | 0.6974 | 1.5258 | 2.0278 |
| | t | −2.0290 | −1.1244 | −0.5223 | 0.9286 | 2.2410 |

Table 1 shows that controlling both spin angular momentum s and orbital angular momentum l values simultaneously was difficult for circular polarization. But, obtaining a particular spin angular momentum s or orbital angular momentum l value was possible. Also, the total angular momentum t follows $\Phi/360°$ for nonzero $\Phi$ and $\theta_P$.

The effectiveness of the array in transferring the input phase and polarization to output was also quantified. The spin and orbital angular momentum conversion efficiency was defined as:

$$\eta_{SAM}=s\times90°/\theta_P \qquad (6)$$

$$\eta_{OAM}=l\times360°/\Phi \qquad (7)$$

For linear polarization, the far-field pattern, phase of $E_x$, electric vectors and the orbital angular momentum values for positive feed phases are shown in FIG. 14-16. The array configuration in FIG. 5E was studied with an epoxy lens of 2.4 μm radius. The spin angular momentum of linear polarization should be zero. Similarly, the orbital component of a beam with no feed phase should also be zero. However, there was always a small part of spin and orbital component excited by the TEL and TML modes due to not being pure TE or TM modes, which results in small deviations from the expected numbers.

Figure 16A:
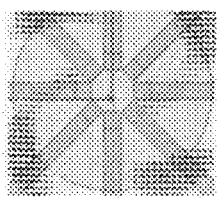
FIG. 16A-FIG. 16D illustrate radiating electric field vectors for linear polarization, according to one example of the present invention.
Figure 16B:
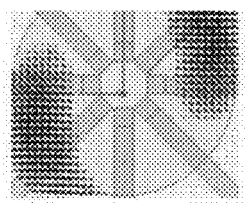
Figure 16C:
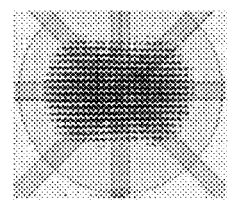
Figure 16D:
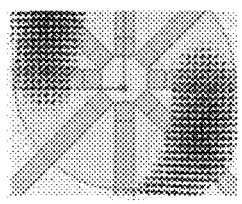
Figure 15A:
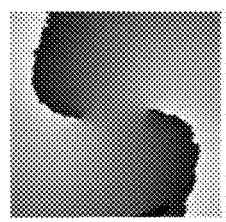
FIG. 15A-FIG. 15D illustrate radiating field phase for linear polarization, according to one example of the present invention.
Figure 15B:
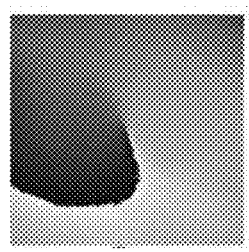
Figure 15C:
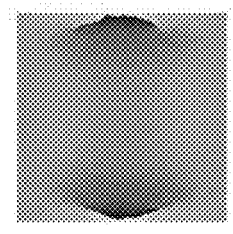
Figure 15D:
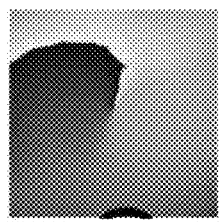
Figure 14A:
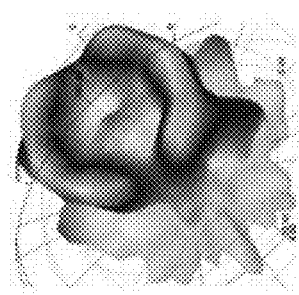
FIG. 14A-FIG. 14D illustrate far-field patterns for linear polarization, according to one example of the present invention.
Figure 14B:
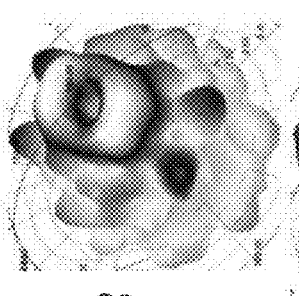
Figure 14C:
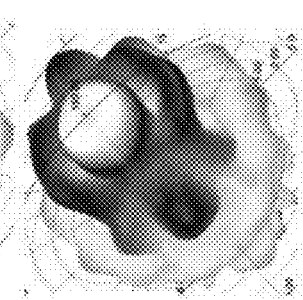
Figure 14D:
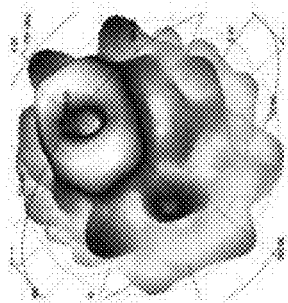

As shown, FIG. 14A, FIG. 15A, FIG. 16A illustrate the far-field patterns, radial field phase, and radiating electric field vectors for $\Phi=-2\times360°$. The spin angular momentum s was measured as −0.1779, the orbital angular momentum was measured as =−1.6578, and t=−1.8357. Similarly, FIG. 14B, FIG. 15B, FIG. 16B illustrate the far-field patterns, radial field phase, and radiating electric field vectors for $\Phi=-360°$. The spin angular momentum s was measured as −0.3321, the orbital angular momentum was measured as l=−0.9935, and t=−0.6614. Further, FIG. 14C, FIG. 15C, FIG. 16C illustrate the far-field patterns, radial field phase, and radiating electric field vectors for $\Phi=0°$. The spin angular momentum s was measured as −0.0208, the orbital angular momentum was measured as =0.0180, and t=−0.0027. FIG. 14D, FIG. 15D, FIG. 16D illustrate the far-field patterns, radial field phase, and radiating electric field vectors for $\Phi=360°$. The spin angular momentum s was measured as −0.3640, the orbital angular momentum was measured as =1.0101, and t=0.6461. Therefore, the orbital angular momentum conversion efficiency $\eta_{OAM}$ for $\Phi=\pm360°$ was very close (l=−0.9935) to 100% as theoretically predicted. But the $\eta_{OAM}$ for $\Phi=\pm720°$ reduces to 83% due to various angular momentum conversions.

Further, a study of vector beams with azimuthal polarization was performed and the results are compiled in FIG. 17-19. The array configuration in FIG. 5E was studied with an epoxy lens of 2.4 μm radius. As shown, FIG. 17A, FIG. 18A, FIG. 19A illustrate the far-field patterns, radial field phase, and radiating electric field vectors for $\Phi=-2\times360°$. The spin angular momentum s was measured as −0.3544, the orbital angular momentum was measured as =−1.5090, and t=−1.8633. Similarly, FIG. 17B, FIG. 18B, FIG. 19B illustrate the far-field patterns, radial field phase, and radiating electric field vectors for Φ=−360°. The spin angular momentum s was measured as 0.2506, the orbital angular momentum was measured as l=−1.1030, and t=−0.8524. Further, FIG. 17C, FIG. 18C, FIG. 19C illustrate the far-field patterns, radial field phase, and radiating electric field vectors for Φ=0°. The spin angular momentum s was measured as −0.0139, the orbital angular momentum was measured as =−0.0075, and t=0.0064. FIG. 17D, FIG. 18D, FIG. 19D illustrate the far-field patterns, radial field phase, and radiating electric field vectors for Φ=360°. The spin angular momentum s was measured as −0.2229, the orbital angular momentum was measured as =1.0864, and t=0.8636. The OAM conversion efficiencies are close to 100% for Φ/360°=±1 and it reduces to ~75% for Φ/360°=2.

Similar results were obtained for radial polarization as well FIG. 20-22. The array configuration in FIG. 5E was studied with an epoxy lens of 2.4 µm radius. As shown, FIG. 20A, FIG. 21A, FIG. 22A illustrate the far-field patterns, radial field phase, and radiating electric field vectors for Φ=−2×360°. The spin angular momentum s was measured as −0.6964, the orbital angular momentum was measured as =−1.7929, and t=−2.4892. Similarly, FIG. 20B, FIG. 21B, FIG. 22B illustrate the far-field patterns, radial field phase, and radiating electric field vectors for Φ=−360°. The spin angular momentum s was measured as 0.2209, the orbital angular momentum was measured as l=−1.1113, and t=−0.8903. Further, FIG. 20C, FIG. 21C, FIG. 22C illustrate the far-field patterns, radial field phase, and radiating electric field vectors for Φ=0°. The spin angular momentum s was measured as −0.0314, the orbital angular momentum was measured as =0.0153, and t=−0.0161. FIG. 20D, FIG. 21D, FIG. 22D illustrate the far-field patterns, radial field phase, and radiating electric field vectors for Φ=360°. The spin angular momentum s was measured as 0.1853, the orbital angular momentum was measured as =1.1610, and t=1.3463. Once again, the OAM conversion efficiencies are close to 100% for Φ/360°=±1 and it reduces to ~90% for Φ/360°=2. The 'radial' or 'azimuthal' modes with orbital angular momentum imparted cease to have azimuthal/radial field vectors, respectively. Some of those modes even have maxima at the beam center. Yet, their original mode names are used to classify them.

Example 3: Output Window Design

The substrate side output window was formed by etch-back of the Si substrate. The output power and directionality was improved with additional antireflection (AR) coating or hemispherical lenses. The AR coating allows better light output by reducing the reflection at SiO2 ($\varepsilon_r$~4)-air interface. A lens for improving the directionality was formed by a microdroplet of epoxy ($\varepsilon_r$~3.6) or polyethylene ($\varepsilon_r$~2.25), while the AR coating at 1550 nm was taken as a 680 nm thick polyethylene film. The angular momentum values were compared for different output window structures and associated far-field patterns in FIG. 23-24 with a feed phase Φ=720° (for desired angular momentum values s=0 and l=2). The output windows studied here has FIG. 23A showing epoxy lens with radius r=1.6 µm, FIG. 23B having an epoxy lens with r=2.4 µm, FIG. 23C depicting a polyethylene lens with r=2.4 µm and FIG. 23D with flat anti-reflective coating. Array in FIG. 5E was considered here with linear polarization in the output. The lens provides a better possible range of orbital angular momentum l since it compensates the beam divergence due to increasing orbital angular momentum l, to an extent. The best performance among the four designs considered in FIG. 13 is provided by the 2.4 µm radius hemispherical epoxy lens in FIG. 23B, which provides an OAM value of −1.6578 for a feed phase of −720°.

The proposed system with a hemispherical epoxy lens having r=2.4 µm epoxy lens provided $\eta_{OAM}$ of ~83% against the ~53% for r=1.6 µm epoxy lens, ~77% for r=2.4 µm polyethylene lens and ~39% for simple AR coating. The 8-element array in FIG. 23B having an epoxy lens with r=2.4 µm provided nearly 100% OAM conversion efficiency (l=−0.9935) for Φ=360° (FIG. 9B). An elaborate design of a lens further improves the beam quality and help achieve the theoretical limit of l=±3 for an 8-element array. Even with the current epoxy hemisphere of r=2.4 µm, the beams were directional with >10 dB maximum gain for most of the modes studied here.

The orbital angular momentum conversion efficiencies obtained are approximately 100% for linear, approximately 110% in azimuthal, and approximately 110% for radial polarizations for a feed phase of ±360°. The deviations are more pronounced for a feed phase of −720° resulting in conversion efficiencies of 82.89% for linear, 93.17% for azimuthal, and 89.65% for radial polarization. The effects of spin and orbital angular momentum conversion were more pronounced in the case of circular polarizations and simultaneous control of spin and orbital angular momentum charges is difficult. Based on the simulations, the proposed array was established to be a simple and effective source for scalar and vector vortices with linear, azimuthal and radial polarization, with tunable angular momentum charge.

Although the detailed description contains many specifics, these should not be construed as limiting the scope of the invention but merely as illustrating different examples and aspects of the invention. It should be appreciated that the scope of the invention includes other embodiments not discussed herein. Various other modifications, changes and variations which will be apparent to those skilled in the art may be made in the arrangement, operation and details of the system and method of the present invention disclosed herein without departing from the spirit and scope of the invention as described here.

The invention claimed is:

1. An optical antenna array system comprising:
 a coherent light source providing an input optical beam;
 a phase modulator;
 a polarization unit; and
 a plurality of waveguides, each having a linear axis, each waveguide ending in either a pointed tip mirror or a chisel edge mirror having an angle of 45 degrees with the direction of the linear axis, the waveguides positioned with the axes of the waveguides in a planar array with the axis of each waveguide directed toward a common point;
 wherein the phase modulator receives the input optical beam from the coherent light source and controls phase of the input beam, the polarization unit receives the input beam from the phase modulator and produces a predetermined polarization of the input beam, each of the waveguides receive the input beam from the polarization unit at an end of the waveguide opposite the end with the mirror, and the waveguide elements each guide a beam to the mirror end and reflect that beam 90 degrees, together producing an output beam comprising a plurality of parallel beams produced by the waveguides.

2. The optical antenna array system as claimed in claim 1, wherein the phase modulator and the polarization unit are coupled to the waveguides on a chip using a planar process.

3. The optical antenna array system as claimed in claim 1, wherein each one of the plurality of waveguides comprises an output window having one or more lenses and antireflection coating.

4. The optical antenna array system as claimed in claim 1, wherein the the angle θ is greater than 45 degrees and the output beam diverges.

5. The optical antenna array system as claimed in claim 1, wherein the predetermined input polarization is one of transverse electric like (TEL) mode, transverse magnetic like (TML) mode, or a linear combination of TEL and TML modes.

6. The optical antenna array system as claimed in claim 1, wherein in a first instance the predetermined input polarization is a linear combination of TEL and TML modes making the output polarization a linear polarization, in a second instance the predetermined input polarization is a TE mode making the output polarization azimuthal polarization, in a third instance the predetermined input polarization is a TM mode making the output polarization radial polarization, and in a fourth instance the predetermined input polarization comprises a 90° phase shift between two orthogonal polarizations, making the output polarization circular.

7. The optical antenna array system as claimed in claim 1, wherein angular momentum of the output beam is generated by providing incremental input phase.

8. The optical antenna array system as claimed in claim 1, wherein the predetermined angle is less than 45° and the output beam converges.

9. A method of generating vortex or non-vortex beams, comprising:
receiving an input beam;
controlling phase of the input beam with a phase modulator and the input polarization with a polarization unit;
feeding the controlled input beam to each of a plurality of waveguides, each waveguide having a linear axis, each waveguide ending in either a pointed tip mirror or a chisel edge mirror having an angle θ with the direction of the linear axis, the waveguides positioned with the axes of the waveguides in a planar array with the axis of each waveguide directed toward a common point; and
generating an output-beam comprising beams reflected from the mirrors of the waveguides.

10. The optical antenna array system as claimed in claim 1 wherein there are four waveguides each ending in a pointed tip mirror with axes of the waveguides passing through the common point and each axis separated from adjacent axes by 90 degrees.

11. The optical antenna array system as claimed in claim 1 wherein there are four first waveguides each ending in a pointed tip mirror, with the pointed tip of each of the four first waveguides adjacent the common point, axes of the first waveguides passing through the common point and each axis separated from adjacent axes by 90 degrees, and four second waveguides each ending in a pointed tip mirror, the four second waveguides positioned one each between each set of two of the first waveguides with the axis of each second waveguide passing through the common point.

12. The optical antenna array system as claimed in claim 1 wherein there are eight waveguides each ending in a pointed tip mirror, positioned in a planar array with axes of the waveguides passing through the common point on radii of the circle with the axes evenly angularly spaced around the common point.

13. The optical antenna array system as claimed in claim 1 wherein there are four waveguides each ending in a chisel edge mirror, arranged in a planar array with axes passing through the common point and equally angularly spaced around the common point, and four waveguides each ending in a pointed tip mirror, arranged in the same plane as the waveguides with chisel edge mirrors and positioned one each between the waveguides with chisel edge mirrors.

14. The optical antenna array system as claimed in claim 1 wherein there are eight waveguide elements each ending in a chisel edge mirror positioned in a planar array with axes passing through the common point and equally angularly spaced around the common point.

* * * * *